United States Patent [19]

Okura

[11] 4,375,754
[45] Mar. 8, 1983

[54] VEHICLE TEMPERATURE CONTROL APPARATUS

[75] Inventor: Eiji Okura, Konan, Japan

[73] Assignee: Diesel Kiki Company, Ltd., Tokyo, Japan

[21] Appl. No.: 280,733

[22] Filed: Jul. 6, 1981

[30] Foreign Application Priority Data

Jul. 8, 1980 [JP] Japan .................. 55-92306

[51] Int. Cl.³ .................. F25D 17/00; F24F 7/00
[52] U.S. Cl. .................. 62/180; 165/43; 236/49; 236/91 F
[58] Field of Search .......... 236/49, 91 F, 91 G; 165/43; 62/209, 180

[56] References Cited

U.S. PATENT DOCUMENTS 4,058,255 11/1977 Linder et al. .................. 236/91 F
4,189,093 2/1980 Schnaibel et al. .................. 236/91 F
4,272,015 6/1981 Houser .................. 165/43 X Primary Examiner—William E. Wayner
Attorney, Agent, or Firm—Jordan and Hamburg

[57] ABSTRACT

Whether the rear seat in a passenger compartment of a motor vehicle is occupied or not is sensed and, if not, a mode door adapted to control the proportion of air flows through upper and lower outlets of an air flow duct is suitably controlled such that the amount of air blown out from the lower outlet into the passenger compartment is increased relative to that from the upper outlet which will direct the air toward the rear end of the passenger compartment. Additionally, the temperature for turning the compressor on and off are shifted to slightly higher levels compared with the temperatures at which the compressor would be turned on and off if the rear seat were occupied.

8 Claims, 7 Drawing Figures

VEHICLE TEMPERATURE CONTROL APPARATUS

BACKGROUND OF THE INVENTION

The present invention relates to an apparatus for controlling the temperature in an enclosure such as a passenger compartment of an automotive vehicle.

Such a system typically comprises a heater and a cooler disposed in an air duct which opens into a vehicle passenger compartment. The heater and cooler are automatically controlled to maintain the temperature in the compartment at a desired set or command value. An air mix door or damper is provided to control the proportion of air flow through the heater and cooler.

Under low cooling load conditions, a compressor or an evaporator of the cooler are maintained on or the compressor is operated in on ON-OFF mode by a defroster switch having a constant changeover temperature level to maintain the temperature of air passing through the evaporator at a constant level. The air mix door mixes heated air from the heater with cooled air from the cooler to provide the desired compartment temperature.

It is not efficient to mix heated air with cooled air due to the irrational waste of power caused by the heater and cooler working against each other. The conventional prior art arrangement further wastes power since the compressor is operated more than necessary. The power wasted by the temperature control apparatus is produced by the engine, resulting in reduced vehicle performance and increased consumption of expensive fuel.

One expedient to solve the problem mentioned above has been proposed, for example, in copending U.S. Patent Application Ser. No. 178,647, filed Aug. 15, 1980 which is assigned to the same assignee as the present application and in which the outlet temperature of a cooler is controlled within predetermined limits in accordance with the difference between a desired set temperature in a passenger compartment and the actual temperature therein in such a manner as to minimize the time the cooler is energized. Minor temperature variations in the compartment occurring while the cooler is off are compensated for by positioning an air mix door.

In more detail, the proposed temperature control apparatus disclosed in the copending prior application comprises a set unit for setting a desired or command compartment temperature for the compartment, a compartment temperature sensor for sensing an actual compartment temperature in the compartment, a temperature control unit including an evaporator and a heater core for discharging temperature controlled air into the compartment, and an outlet temperature sensor for sensing an outlet temperature of the temperature control unit. There is further provided with an operation control unit which functions to turn the outlet temperature control unit on and off. The operation control unit computes a control on temperature and a control off temperature as predetermined functions of the command compartment temperature and the actual compartment temperature, turn the temperature control unit on when the outlet temperature is higher than the control on temperature and turn the temperature control unit off when the outlet temperature is lower than the control off temperature.

Indeed, such a temperature control apparatus may succeed in saving power due to the substantial cut-down in the operation rate of the compressor. However, it still fails to avoid a drawback that the cooling extent tends to become excessive despite a small number of vehicle passengers or short despite a large number of vehicle passengers, making the passengers feel uneasy and detrimenting the power saving efficiency.

Generally, in a passenger compartment of an automotive vehicle, the front seat is positioned substantially at the center and the rear seat at the rear end. In this respect, whereas the upper outlet of air flow duct open into the passenger compartment at the instrument panel is used to blow out air toward the upper half of the body of an occupant on the front seat and therefrom toward an occupant on the rear seat, the lower outlet adjacent to the legs of the front seat occupant is used to blow air concentrically toward the legs of the front seat occupant and the neighborhood. It is thus possible to control the distribution of air to the upper and lower outlets such that, when only the front seat is occupied, the amount of air coming out of the lower outlet is increased relative to that of air blown out from the upper outlet to thereby direct the air principally to the front seat occupant. Also, it is possible to reduce the cooling ability of the compressor by reducing its operation rate without affecting the comfortableness inside the passenger compartment to any noticeable degree. The present invention has been elaborated with these facts in view.

SUMMARY OF THE INVENTION

In accordance with the present invention, the number of passengers, particularly, presence of at least one passenger on the rear seat is sensed and, if the rear seat is unoccupied at all, the mode door for controlling the ratio of air flows through the upper and lower outlets into the passenger compartment is suitably controlled such that the amount of air supplied from the lower outlet is increased relative to that of air supplied from the upper outlet which will be directed to the rear end of the passenger compartment. Additionally, the temperatures for turning the compressor on and off are shifted to slightly higher levels (for example, by an amount of 1°-2° C.) compared with the temperatures at which the compressor will be turned on and off when the rear seat is occupied.

It is an object of the present invention to provide an improved vehicle temperature control apparatus which operates in a more efficient manner than comparable apparatus known heretofore.

It is another object of the present invention to provide an improved vehicle temperature control apparatus which saves power by suitably controlling the operation rate of the compressor in accordance with the presence/absence of a passenger on the rear seat in the passenger compartment.

It is another object of the present invention to provide an apparatus which offers vehicle passengers more pleasant feelings than ever while air inside the passenger compartment is being cooled.

It is another object of the present invention to provide a generally improved vehicle temperature control apparatus.

Other objects, together with the foregoing, are attained in the embodiments described in the following description and illustrated in the accompanying drawing.

DESCRIPTION OF THE PREFERRED EMBODIMENTS

While the vehicle temperature control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
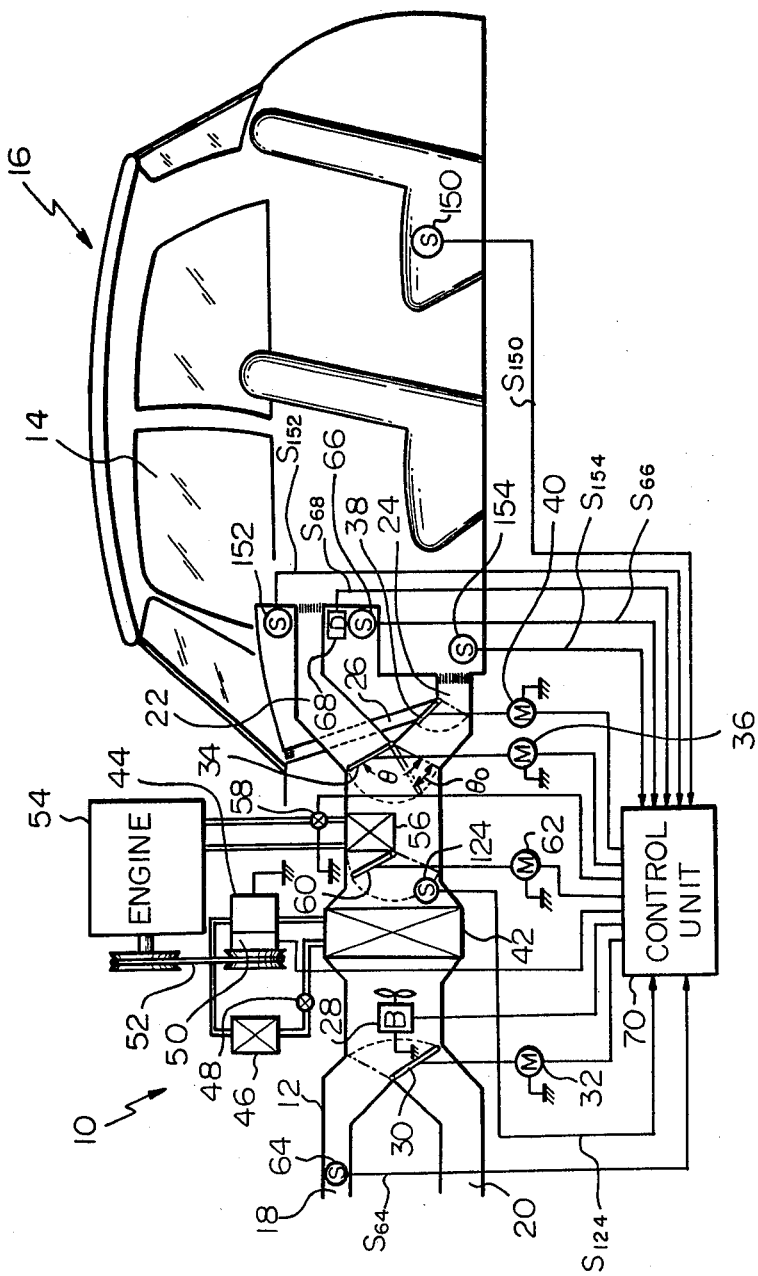
FIG. 1 is a schematic diagram of a vehicle temperature control apparatus embodying the present invention.

Referring now to FIG. 1 of the drawing, a vehicle temperature control apparatus embodying the present invention is generally designated by the reference numeral 10 and comprises an air flow duct 12 which leads into an enclosure 14 such as a passenger compartment of an automotive vehicle 16. The duct 12 has an outside air inlet 18 and a recirculated air inlet 20 which communicates with the compartment 14, although the connection is not illustrated. The duct 12 also has an upper outlet 22, a lower outlet 24 and a defroster outlet 26 which open into the compartment 14. Air is forced from the inlets 18 and 20 to the outlets 22, 24 and 26 by a blower 28. Air flow through the inlets 18 and 20 is controlled by a door or damper 30 by means of a motor 32. Air flow through the outlets 22 and 24 is controlled by a mode door 34 by means of a motor 36. Air flow through the outlets 24 and 26 is controlled by a door 38 by means of a motor 40.

An evaporator or cooler 42 is disposed in the duct 12 for cooling air passing therethrough. The evaporator 42 forms a cooling circuit in combination with a compressor 44, a condenser 46 and an expansion valve 48. The compressor 44 is provided with an electrically controlled clutch 50 which is connected through a belt 52 with a vehicle engine 54. A heater core 56 is disposed in the duct 12 downstream of the evaporator 42. Hot water from the vehicle engine cooling system is passed through a valve 58 into the heater core 56 to heat air passing through the duct 12. An air mix door 60 is movable by means of a motor 62 to control the proportion of air passing through and around the heater core 56 and thereby the temperature of air discharged from the duct 12 into the compartment 14.

A sensor 64 is provided to sense the outside air temperature to produce an output signal $S_{64}$. A sensor 66 senses the air temperature in the compartment 14 to produce an output signal $S_{66}$. A set unit comprising a dial, variable and resistor the like is designated as 68 and produces a set output signal $S_{68}$. The vehicle operator sets the desired or command compartment temperature into the apparatus 10 by means of the set unit 68. For example, if the operator wishes the temperature in the compartment 14 to be 25° C., he will turn a dial (not shown) in the set unit 68 until it indicates 25° C.

The output signals of the sensors 64 and 66 and the set unit 68 are fed to inputs of a control unit 70 which may comprise a microcomputer or discrete components. The motors 32, 36, 40 and 62 are controllably powered by the control unit 70.

The control unit 70 is constructed to turn the compressor 44 on or off by means of the electrically controlled clutch 50. The manner in which this operation is automatically performed will be described with reference to FIGS. 2 to 5.

Figure 2:
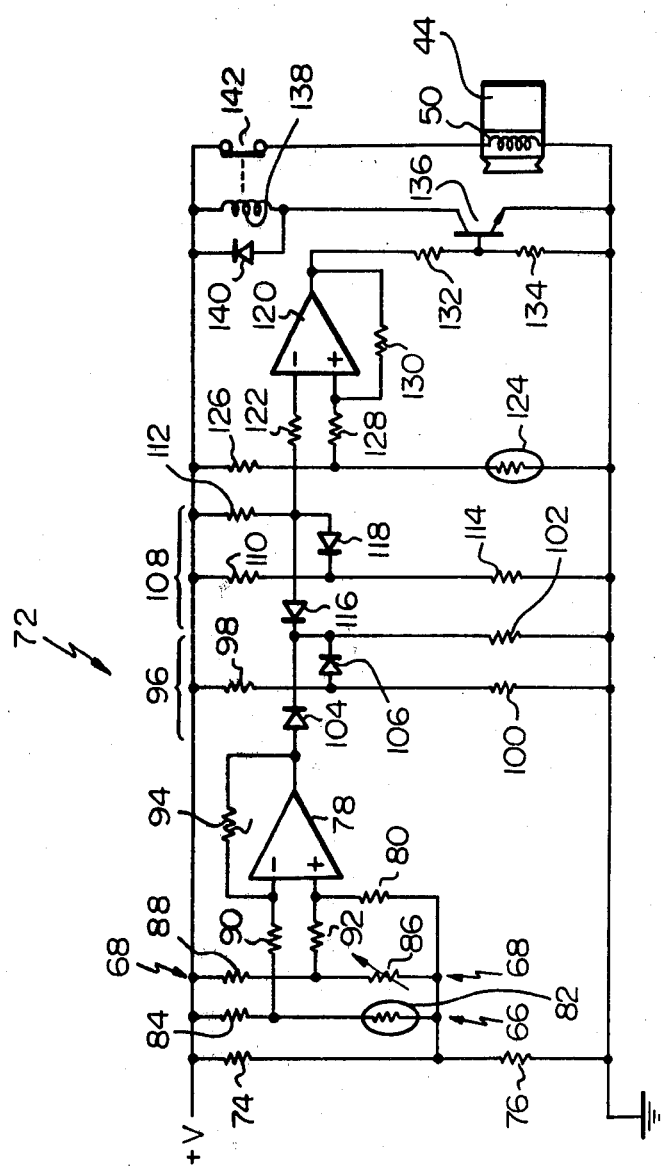
FIG. 2 is an electrical schematic diagram of a compressor control circuit of the present apparatus.

A portion of the control unit 70 which controls the clutch 50 is designated as 72 in FIG. 2 and comprises a voltage divider consisting of resistors 74 and 76 connected in series between a positive source +V and ground. The junction of the resistors 74 and 76 is connected to the non-inverting input of an operational amplifier 78 through an input resistor 80. The sensor 66 is constituted by a thermistor 82 connected in series with a resistor 84 across the resistor 74. The set unit 68 comprises a variable resistor 86 connected in series with a resistor 88 across the resistor 74. The junction of the thermistor 82 and resistor 84 is connected through an input resistor 90 to the inverting input of the operational amplifier 78 whereas the junction of the resistors 86 and 88 is connected through a resistor 92 to the non-inverting input of the operational amplifier 78. The amplifier 78 is connected to function in the differential mode with negative feedback being provided by a resistor 94.

The output of the amplifier 78 is connected through a first clamp circuit 96 consisting of resistors 98, 100 and 102 and diodes 104 and 106 and a second clamp circuit 108 consisting of resistors 110, 112 and 114 and diodes 116 and 118 to the inverting input of an operational amplifier 120 by means of an input resistor 122. Another sensor in the form of a thermistor 124 is disposed downstream of the evaporator 42 to sense the outlet temperature thereof to produce an output signal $S_{124}$. The thermistor 124 is connected in series with a resistor 126 between +V and ground. The junction of the thermistor 124 and resistor 126 is connected through an input resistor 128 to the non-inverting input of the amplifier 120. The amplifier 120 is connected to function as a voltage comparator with hysterisis provided by a feedback resistor 130.

The output of the amplifier 120 is connected through resistors 132 and 134 to ground. The junction of the resistors 132 and 134 is connected to the base of an NPN transistor 136, the emitter of which is connected to ground. The collector of the transistor 136 is connected to +V through a relay coil 138. A diode 140 is connected in parallel with the coil 138. Contacts 142 connected in series with the clutch 50 between +V and ground are closed when the coil 138 is energized, thereby turning on the compressor 44.

Figure 4:
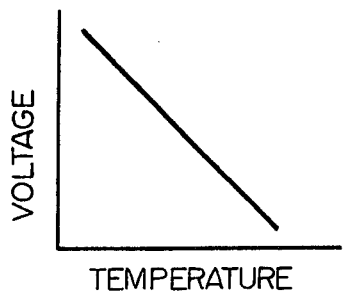

The operating characteristic of the thermistors 82 and 124 is shown in FIG. 4. The electrical resistances and thereby the voltages across the thermistors 82 and 124 which are applied to the amplifiers 78 and 120 respectively from the thermistors 82 and 124 decrease as the temperatures sensed by the thermistors 82 and 124 increase.

Figure 3:
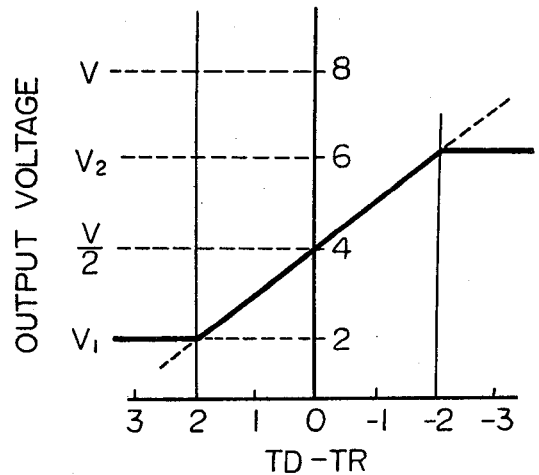
FIGS. 3 to 6 are graphs illustrating the operation of the present apparatus.

It will be assumed that the command compartment temperature set in the unit 68 is designated as TD whereas the actual compartment temperature sensed by the sensor 66 is designated as TR. The output of the amplifier 78 is illustrated in FIG. 3. Increasing the resistance of the resistor 86 increases the voltage applied to the non-inverting input of the amplifier 78 and thereby the set or command temperature TD. As the actual temperature TR in the compartment 14 increases, the voltage at the inverting input of the amplifier 78 decreases. The output of the amplifier 78 is proportional to the difference between the temperatures TD and TR, or TD-TR. Where the temperatures TD and TR are equal, the output of the amplifier 78 is V/2 or 4 volts. Where the actual temperature TR exceeds the command temperature TD by 2° C., the output of the amplifier 78 is 6 volts, etc.

The function of the clamp circuit 96 is to prevent the discharge temperature of the evaporator 42 from increasing above a predetermined level at which the response time of the apparatus 10 becomes too long to ensure the comfort of the occupants. This level corresponds to V1 (2 volts). As will be understood from further description, the voltage at the output of the amplifier 78 (between limits V1 and V2) is inversely proportional to a desired outlet temperature of the evaporator 42.

As long as the voltage at the output of the amplifier 78 is above V1, the diode 104 will be forward biased and the diode 106 will be reverse biased so that the output of the amplifier 78 is applied to the clamp circuit 108. However, if the output voltage of the amplifier 78 drops below V1, the diode 104 will be reverse biased and the diode 106 will be forward biased, applying the voltage at the junction of the resistors 98 and 100 (V1) to the clamp circuit 108.

The clamp circuit 108 functions to prevent the outlet temperature of the evaporator 42 from falling below a predetermined value at which the evaporator 42 would freeze. As long as the voltage at the output of the amplifier 78 is below a limit value V2, the diode 116 will be forward biased and the diode 118 will be reverse biased and the output of the clamp circuit 96 will be applied through the clamp circuit 108 to the amplifier 120. If, however, the output voltage of the amplifier 78 rises above V2, the diode 116 will become reverse baised and the diode 118 will become forward biased to apply the voltage at the junction of the resistors 110 and 114 (V2) to the input of the amplifier 120.

Whereas the voltage at the inverting input of the amplifier 120 increases (within the limit values V1 and V2) as the temperature TR in the compartment 14 increases, the voltage at the non-inverting input of the amplifier 120 decreases as the temperature at the outlet of the evaporator 42 increases. The voltage at the inverting input of the amplifier 120 constitutes a command temperature at the outlet of the evaporator 42 which increases as the temperature TR in the compartment 14 decreases. When the output of the amplifier 120 is high, the transistor 136 is turned off and the compressor 44 is turned off. Conversely, when the output of the amplifier 120 is low, the transistor 136 is turned on and the compressor 44 is also turned on.

From the above it will be understood that the amplifier 120 provides, due to the hysterisis provision, a temperature dead range between an upper trip point which corresponds to a compressor off or lower control temperature and a lower trip point which corresponds to a compressor on or upper control temperature. It is, however, well within the scope of the present invention to eliminate the resistor 130 and thereby the hysterisis provision of the amplifier 120 so that there is only one changeover point rather than two.

Figure 5:
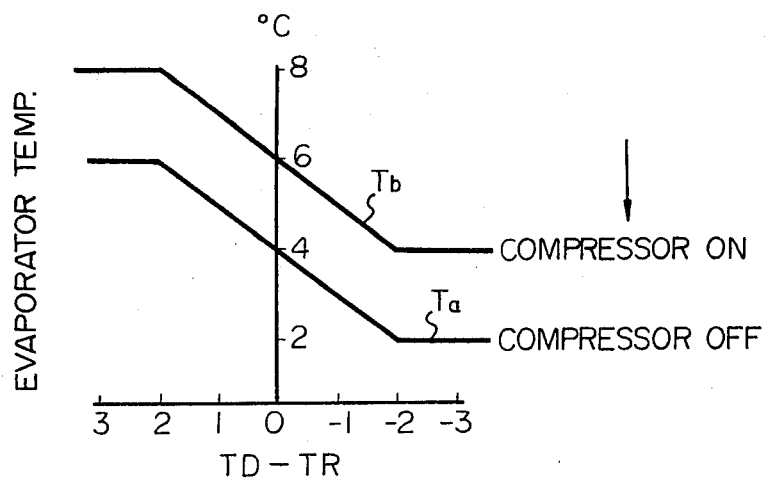

FIG. 5 illustrates the operation of the circuit 72. The lower control temperature (compressor off temperature level) is designated as Ta whereas the upper control temperature (compressor on temperature level) is designated as Tb. There is a parallel channel of 2° C. between the temperature Ta and Tb. The evaporator temperature is maintained between 6°-8° C. as long as the compartment temperature TR is 2° C. or more below the set or command temperature TD. Conversely, the temperature of the evaporator 42 is maintained between 2°-4° C. as long as the actual temperature TR is 2° C. is more higher than the command temperature TD to increase the cooling efficiency. Within this range, the evaporator temperature is controlled to be inversely proportional to the actual temperature TR.

In accordance with an important feature and subject matter of the present invention, the apparatus 10 is further provided with a specific sensor 150 for detecting the presence of at least one vehicle passenger on the rear seat in the vehicle compartment 14 to produce an output signal $S_{150}$, a sensor 152 for sensing the air temperature in the upper portion of the vehicle compartment 14 to produce an output signal $S_{152}$ and another sensor 154 for sensing the air temperature in the lower portion of the vehicle compartment 14 to produce an output signal $S_{154}$. The output signals of the sensors 150, 152 and 154 are fed to other inputs of the control unit 70.

The vehicle temperature control apparatus having the construction described above will be operated as follows.

When the sensor 150 does not detect any passenger on the rear seat in the vehicle compartment 14, the control unit 70 actuates the mode door 34 to vary its opening degree $\theta$ to one expressed as $C(Tf-Th-A)+\theta_0$ where C and A denote constants, $\theta_0$ denotes a predetermined opening degree (for example, one which proportions the amounts of air flow through the upper and lower outlets 22 and 24 to within the range of 1:5 to 1:3), Th the air temperature around the front passenger's head sensed by the sensor 152 and Tf the air temperature around the front passenger's legs sensed by the sensor 154. The opening degree $C(Tf-Th-A)+\theta_0$ of the mode door 34 supplies an increased amount of cooled air toward the front passenger's legs via the lower outlet 24. The expression $C(Tf-Th-A)+\theta_0$ shows that, when the rear seat is unoccupied, the mode door 34 which holds at least an opening degree of $\theta_0$ has the opening degree compensated by $C(Tf-Th-A)$ to make the air temperature Th around the head lower than the temperature Tf around the legs always by a constant amount A (3° C. for example). Thus keeping the temperature around the head lower than the temperature around the legs 3° C. for instance will offer the passenger more pleasant feelings than the case without such a temperature difference.

When at least one passenger is sensed by the sensor 150 on the rear seat, the actual compartment temperature TR is compared with the set or command temperature TD. If their relation is not TD<TR, the opening degree $\theta$ of the mode door 34 is again set at $C(Tf-Th-A)+\theta$ allowing an increased amount of cooled air to reach the front passenger's legs through the lower outlet 24. If the relation TD<TR holds, the opening degree $\theta$ of the mode door 34 is reduced to zero so that cooled air is directed only to the front seat passenger's head and therefrom to the rear seat passenger. The case without the relation TD<TR means that the actual compartment temperature TR has been lowered than the set or command temperature TD and, therefore, more than necessary; under this condition, the mode door 34 has the opening degree $\theta$ increased to direct air to the passenger's legs.

Figure 6:
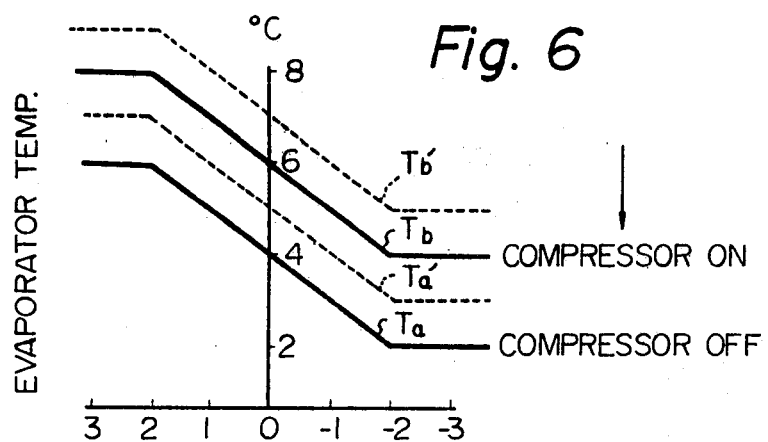

The compressor off temperature and compressor on temperature are controlled according to a formula TD−TR+2 as will be seen from the foregoing description. These temperatures are indicated by solid lines Ta and Tb in FIG. 6 defining a parallel channel of 2° C. therebetween. As the temperature difference TD−TR diminishes, the temperatures Ta and Tb are progressively lowered until they become saturated at 2° C. and 4° C., respectively.

Figure 7:
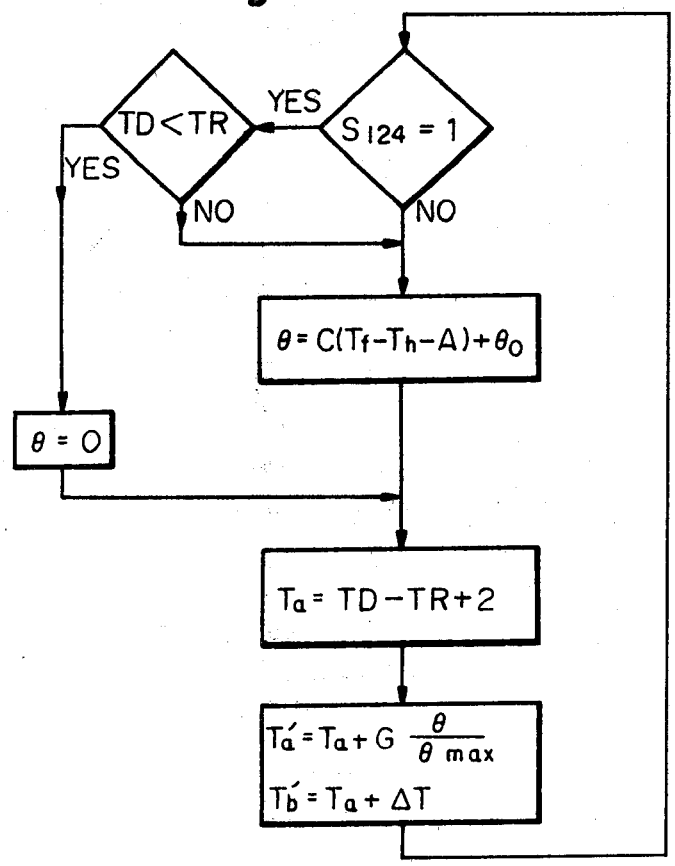
FIG. 7 is a flowchart outlining the operation of the present apparatus.

According to the present invention, the compressor off temperature Ta thus controlled is compensated by $G\theta/\theta_{max}$ where G indicates a constant and $\theta_{max}$ indicates the maximum opening degree of the mode door 34 which entirely cuts off the air supply through the upper outlet 22. Therefore, when the opening degree $\theta$ of the mode door 34 is zero, $G\theta/\theta_{max}$ is zero and the compressor off temperature Ta is not compensated at all (as indicated by the solid lines in FIG. 6). When the opening degree $\theta$ of the mode door 34 is C(Tf-Th-A)+$\theta_0$, the compressor off temperature Ta is shifted from the solid line level to a phantom line level Ta' which is higher than the solid line level by an amount $G\theta/\theta_{max}$. This amount $G\theta/\theta_{max}$ lies within the range of 1°-2° C. for instance. Since the compressor on temperature Tb constantly remains higher than the compressor off temperature Ta by $\Delta T$ (for example, 2° C.), the shift of the compressor off temperature from Ta to Ta' is accomplished by the shift of the compressor on temperature from the level Tb to a higher level Tb' maintaining the same parallel channel of 2° C. therebetween. Such operations of the control system will be understood from the flowchart shown in FIG. 7.

In summary, it will be seen that the present invention provides an improved vehicle temperature control apparatus which, when the rear seat in a passenger compartment is unoccupied, opens the mode door 34 to an opening degree $\theta_0$ to blow cooled air principally toward the front seat passenger's legs while reducing the amount of air flow to the rear end of the compartment. The opening degree $\theta_0$ is so compensated that the air temperature around the front passenger's head remains lower than the air temperature around the legs by an amount A. At this instant, the compressor off temperature Ta and compressor on temperature Tb are individually shifted to higher levels by a common amount which is proportional to the opening degree $\theta$ of the mode door 34, so that the operation rate of the compressor is reduced compared with the operation rate which would be established if the rear seat were occupied. Stated another way, the larger the amount of air flow through the lower outlet, the lower the operation rate of the compressor 44. Otherwise, the flow of cooled air toward a lower part of the front seat would lower the air temperature therearound and thereby cause unpleasant sensations in the passenger. The apparatus of the invention in this way offers vehicle passengers favorable feelings while saving power at the same time. Various modifications will become possible for those skilled in the art after receiving the teachings of the present disclosure without departing from the scope thereof.

What is claimed is:

1. A temperature control apparatus for controlling a temperature in a passenger compartment of an automotive vehicle comprising:

set means for setting a command compartment temperature for the compartment;

compartment temperature sensor means for sensing an actual compartment temperature in the compartment;

temperature control means for discharging temperature controlled air into the compartment;

outlet temperature sensor means for sensing an outlet temperature of the temperature control means;

rear seat passenger sensor means for detecting presence and absence of at least one vehicle passenger on a rear seat in the compartment;

air flow control means for controlling flows of the temperature controlled air into an upper portion and a lower portion of the compartment; and operation control means for turning the temperature control means on and off;

said operation control means being constructed to compute a control on temperature and a control off temperature as predetermined functions of the command compartment temperature and the actual compartment temperature, turn the temperature control means on when the outlet temperature is higher than the control on temperature and turn the temperature control means off when the outlet temperature is lower than the control off temperature;

said operation control means being further constructed to determine a proportion of the temperature controlled air into the compartment lower portion to the temperature controlled air into the compartment upper portion depending on whether the rear seat is occupied by a passenger.

2. A temperature control apparatus as claimed in claim 1, in which, when the rear seat is unoccupied, said operation control means controls the air flow control means to control the flow of the temperature controlled air such that an increased amount of the controlled air is supplied into the lower portion relative to an amount of the controlled air into the upper portion.

3. A temperature control apparatus as claimed in claim 2, in which, when the rear seat is unoccupied, said operation control means further controls the temperature control means to elevate the computed control on temperature and the computed control off temperature as predetermined functions of the command compartment temperature and the actual compartment temperature by a predetermined amount of temperature.

4. A temperature control apparatus as claimed in claim 3, in which said air flow control means comprises a mode door or damper, said predetermined amount is determined by $G\theta/\theta_{max}$ where G is a constant, $\theta$ an opening defined by the mode door into the compartment lower portion and $\theta_{max}$ a maximum opening of the mode door.

5. A temperature control apparatus as claimed in claim 4, in which said predetermined amount is within the range of 1°-2° C.

6. A temperature control apparatus as claimed in claim 2, in which a proportion of the amount of the temperature controlled air into the compartment lower portion to the amount of the controlled air into the compartment upper portion is within the range of 5:1 to 3:1.

7. A temperature control apparatus as claimed in claim 1, in which said air flow control means comprises a mode door or damper, the apparatus further comprising compartment upper portion temperature sensor means for sensing a temperature in the compartment upper portion and compartment lower portion temperature sensor means for sensing a temperature in the compartment lower portion, said operation control means, when the rear seat is unoccupied, being constructed to increase an opening defined by the mode door into the compartment lower portion by a value which is the function of the sensed compartment upper portion temperature and the sensed compartment lower portion temperature.

8. A temperature control apparatus as claimed in claim 7, said value is determined by $C(Tf-Th-A)+\theta$ where C and A are constants, Th the sensed compartment upper portion temperature and Tf the sensed compartment lower portion temperature.

* * * * *